United States Patent [19]

Pilarczyk

[11] 4,122,728

[45] Oct. 31, 1978

[54] CONTROL LEVER ASSEMBLY

[75] Inventor: Charles E. Pilarczyk, Bedford Heights, Ohio

[73] Assignee: Towmotor Corporation, Mentor, Ohio

[21] Appl. No.: 785,619

[22] Filed: Apr. 7, 1977

[51] Int. Cl.[2] .............................................. F16H 21/44

[52] U.S. Cl. ...................................................... 74/103

[58] Field of Search .................... 74/102, 103, 104, 99

[56] References Cited

U.S. PATENT DOCUMENTS

| | | | |
|---|---|---|---|
| 535,826 | 3/1895 | Gee et al. | 74/103 |
| 1,270,068 | 6/1918 | Stevens et al. | 74/102 |
| 1,441,730 | 1/1923 | Marshall | 74/104 |
| 1,580,499 | 4/1926 | Kruttschnitt | 74/103 |
| 3,251,238 | 5/1966 | Fuqua | 74/102 |
| 3,604,454 | 9/1971 | Tomko | 74/102 |

FOREIGN PATENT DOCUMENTS

| | | | |
|---|---|---|---|
| 988,402 | 4/1965 | United Kingdom | 74/102 |

*Primary Examiner*—Benjamin W. Wyche
*Assistant Examiner*—Wesley S. Ratliff, Jr.
*Attorney, Agent, or Firm*—Phillips, Moore, Weissenberger, Lempio & Majestic

[57] ABSTRACT

A control lever assembly including a single unitarily formed lever is mounted relative to an actuator such as a valve stem so that generally linear motion applied to one end of the control lever by an operator results in linear motion to the actuator generally at right angles to the linear motion applied to the control lever by the operator. Provision for dampening of unwanted vibratory motion is incorporated in the bracket arrangement mounting the control level.

9 Claims, 3 Drawing Figures

CONTROL LEVER ASSEMBLY

BACKGROUND OF THE INVENTION

This invention relates to a control lever assembly for operating a linear actuator. In particular, the invention relates to a control lever for operating a valve stem requiring linear motion. The position of the valve stem may be laterally displaced from the upstanding end of the control lever provided to the operator.

Control of valving systems for the operation of work implements may be accomplished either manually or through solonoid operated arrangements. Manual operation of such valves may occur through lever and linkage means enabling an operator to position the valve stem from either a position adjacent to or remote from the valve stem. At least two parameters dictate the design of a mechanical valve control system. First, the force requirement to set the valve stem must be within the range of strength of a normal operator. Since some valve stems require an excessive amount of force to set, the means for positioning such a valve stem may be accomplished through a lever pivoted remote of the valve stem. Secondly, the control lever must be positioned so that the operator has ready access to the lever. Ready access may be difficult because of the positioning of the valve itself and its associated valve stem. Accordingly, the lever may take a non-linear configuration or a more complex arrangement must be provided through the use of bellcranks and associated link means. More complex systems such as just described suffer from more frequent failures than simple unitarily formed control levers. However, a unitarily formed control lever which is pivoted at one point along its length does not provide true linear motion at the valve stem end for a linear operated valve stem. Therefore, it is necessary to provide some arrangement to convert the rotative motion of the end of a pivoted control lever to a linear motion. This has been done by a cross head arrangement or a slotted control lever. Although slotted control levers with a fixed pivot point suffice in some cases, such an arrangement may suffer from undue wear of the valve stem acting against the defined slot. Finally, control levers of any design provide a convenient hand-hold for operators in mounting or dismounting a machine. Such use may cause severe sideloading to the associated valve stem causing premature failure. Since use of such a lever as a hand-hold is unavoidable, the lever and supporting structure must prevent unwanted side loads from reaching the valve stem.

SUMMARY OF THE INVENTION

The present invention is directed to overcoming one or more of the problems as set forth above.

Broadly stated, the invention is a control lever assembly for effecting linear translation of an actuator. The control lever assembly comprises a control lever having one end adapted for pivoted connection to the actuator. A first bracket plate has associated therewith bearing means for mounting the control lever therethrough to allow rotation and translation of the control lever relative the bracket. A second bracket is associated with, and generally extends outwardly at right angles from the first bracket to limit the rotative motion of the control lever to rotation about an axis generally lying in the plane of the first bracket plate and at right angles to the linear motion of the actuator.

A study of the accompanying drawings and the following specification will set forth the objects of this invention.

DETAILED DESCRIPTION OF THE PREFERRED EMBODIMENT

Figure 2:
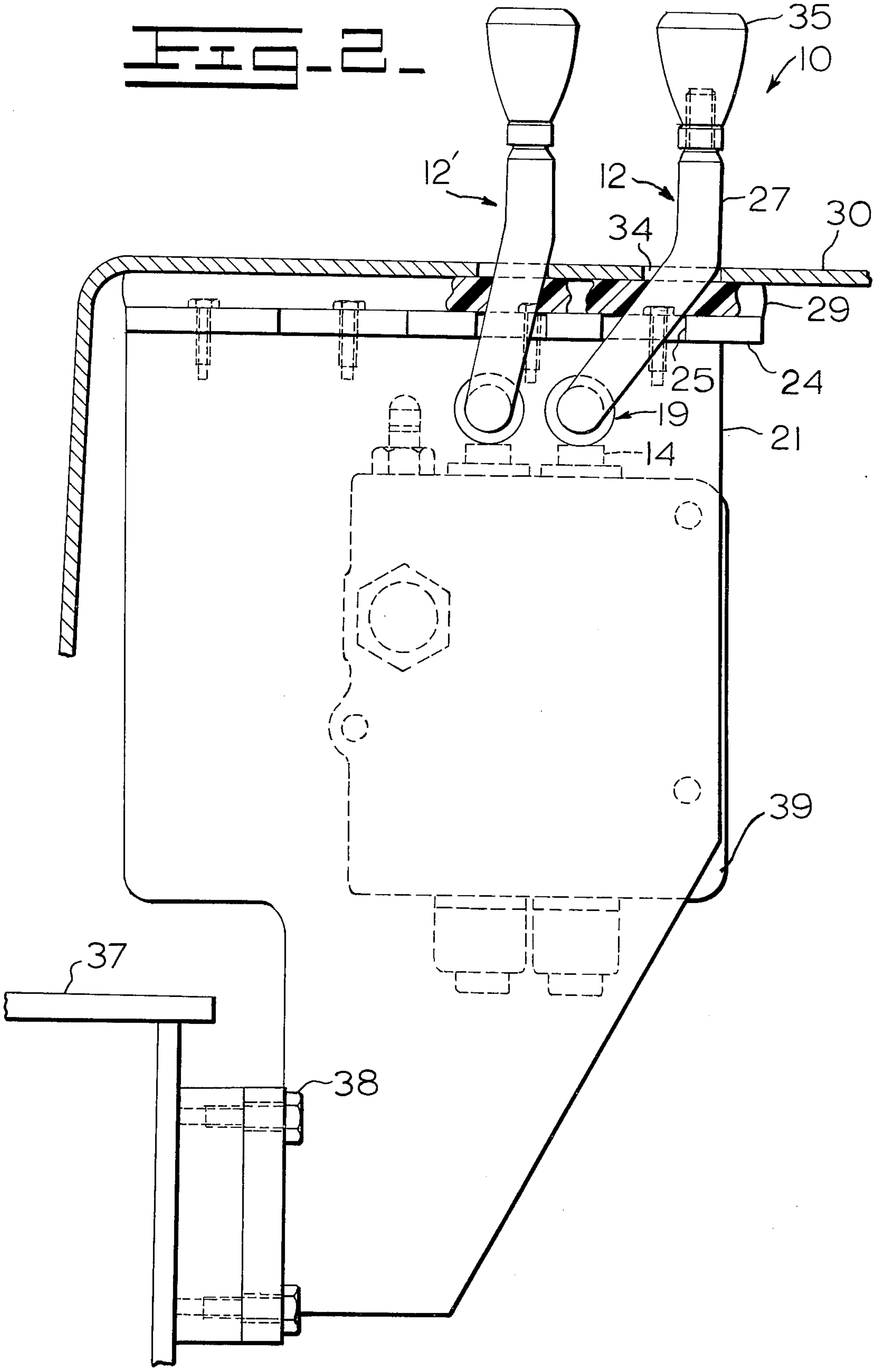
FIG. 2 is a side elevation view partly in section of the control lever assembly depicted in FIG. 1.

A control lever assembly 10, in accord with the invention is depicted in FIG. 2. The illustration in FIG. 2 and FIG. 3 would indicate the mounting of two control levers, it is to be understood that this invention is applicable to one or more control levers each for effecting linear motion to a separate or plural valve actuator such as a valve stem or plurality of valve stems.

A control lever 12 having a generally L-shape is pivotally affixed at one end to a hydraulic actuator such as valve stem 14 which is movable linearly to open and close a hydraulic or pneumatic circuit or the like. Control lever 12 is formed with a bifurcated end 16 defining a bore 17 through each branch of the bifurcation. Bores 17 are adapted to receive a pin 18 or other fastening means to pivotally affix valve stem 14 to the bifurcated end 16 of control lever 12.

Control lever 12 extends generally at right angles from the axis of valve stem 14 through bearing means such as spherical bearing 19 affixed in an aperture 20 defined in a bracket plate 21.

Spherical bearing 19 is formed with an outer race 22 which may be press fitted into aperture 20 or held therein by other means. Spherical bearing 19 also includes an inner race 23 pierced by an aperture 24 formed to slidably receive control lever 12 and allow limited translational motion of control lever 12 therethrough. Inner race 23 is movable in outer race 22 and allows limited three axis rotational movement of control lever 12 relative bracket plate 21 without control lever 12 being fixed at any other point along its length.

Figure 3:
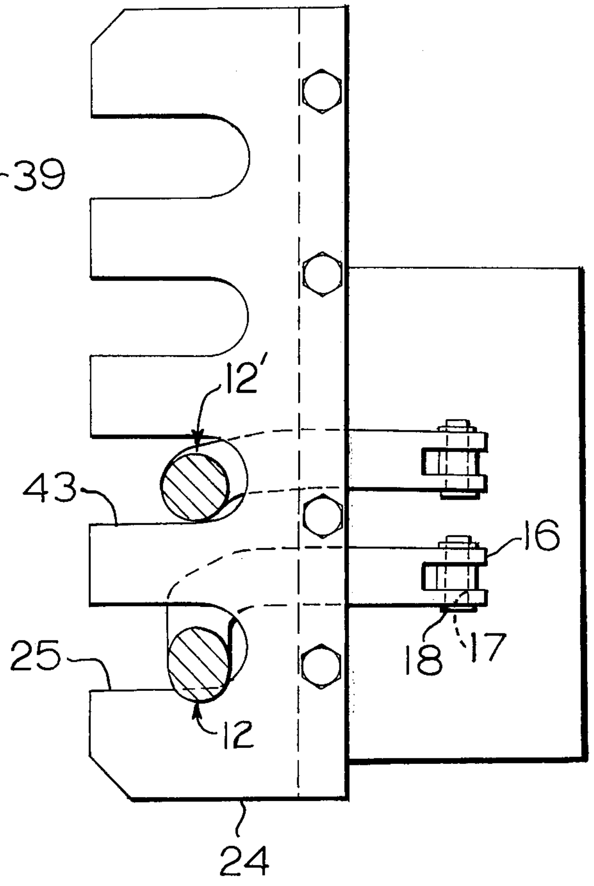
FIG. 3 is a sectional view of the control lever assembly shown in FIG. 1 taken at section line III—III.

Control lever 12 is curved upwardly from spherical bearing 19 distal of valve stem 14 to pass through a second bracket 24 affixed to and extending outwardly from bracket plate 21 generally at right angles therefrom. Bracket 24 is formed with a transverse slot 25 through which the upper portion 27 of control lever 12 extends. The second bracket 24 with transverse slot 25 oriented with its longitudinal axis extending perpendicular to bracket plate 21 as illustrated in FIG. 3, limits the aforedescribed three axis rotative motion allowed in control lever 12 to rotation about an axis generally lying in the plane of the first bracket plate 21 and at right angles to motion of the upper portion of the control lever 12 along the longitudinal axis of the transverse slot 25.

Positioned above bracket 24 is a pliable member 29 which may be retained in position on bracket 24 by a cover plate 30 or the like. Pliable member 29, which may be formed of a soft, plastic-like material or an elastomeric material, serves to dampen unwanted vibratory motion in the control lever assembly and as a corollary reduce sound transmission. In particular, pliable member 29 may be an elongated, rectilinear shaped member in which transverse slits 32 are formed. Each transverse slit is positioned relative the adjacent transverse slot 25 in bracket 24 and upper portion 27 on the associated control lever so that upper portion 27 may be passed therethrough. The diameter of the upper portion 27 of the control lever separates the transverse cut 32 in a manner similar to a boot positioned about a control lever.

Figure 1:
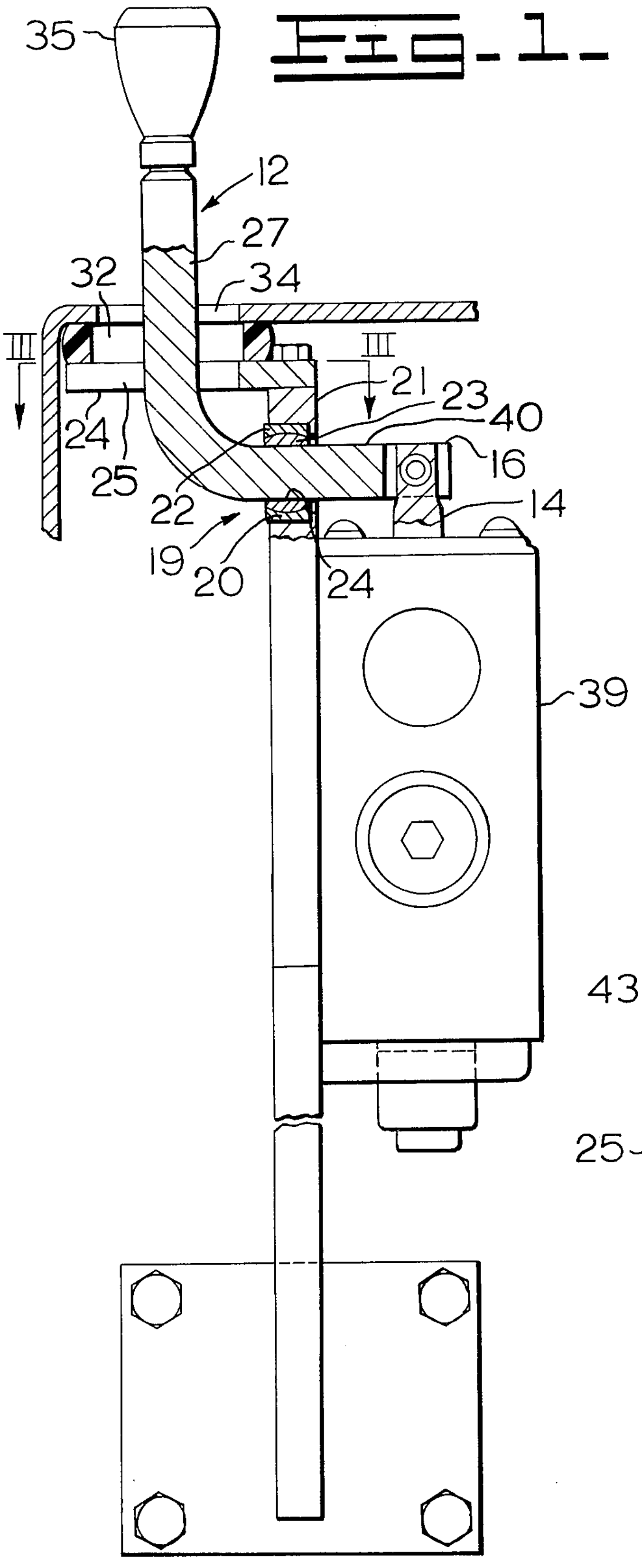
FIG. 1 is an elevation view partly in section of the control lever assembly which is the subject of this invention.

A cover plate 30 formed with a longitudinal opening 34 generally parallel to transverse slot 25 in bracket 24 may be affixed to the associated machine or to the bracket plate 21. Longitudinal opening 34 allows lateral movement of upper portion 27 as shown in FIG. 1, a predetermined amount and thus may serve in part as a stop for the motion of the control lever 12.

Control lever 12 may be formed with an appropriate knob assembly 35 at the upper end thereof for operator comfort.

Use of the aforedescribed control lever assembly should be clear from the above description, however, the following remarks are offered in amplification.

Bracket 21 may be affixed to a vehicle or piece of machinery 37 by appropriate fastening means 38. Valve stem 14, which is reciprocally mounted in a valve housing such as valve housing 39, is fixed relative to bracket plate 21 for example by affixing the valve housing 39 to bracket plate 21. Thus it should be apparent that motion of knob assembly 35 as seen in FIG. 1 either to the right or to the left with the bracket member affixed to a vehicle 37 results in linear motion of valve stem 14. This linear motion is accomplished by the lower portion 40 of the control lever 12 moving linearly through the spherical bearing 19. If control lever 12 were fixed for pivoted motion at bearing 19, the motion of bifurcated end 16 would necessarily be constrained to arcuate motion. The nature of the valve stem 14 is such that linear motion is necessary at bifurcated end 16. Therefore, the structure of bearing means 19 allows linear motion without losing the pivoted capability of a spherical bearing. Rotation of control lever 12 about the other two axes associated with spherical bearing 19 is restricted by slot 25 and fixture of bifurcated end 16 to valve stem 14 by pin 18, thus preventing excessive sideloading to the valve stem resulting in possible failure.

As can be seen by FIGS. 2 and 3, the structure of the aforedescribed control lever assembly is applicable to more than one control lever. In order to accomplish such multiple lever installation, additional transverse slots, such as transverse slot 43, may be formed in bracket 24 to receive a second control lever 12'. It is also important to note that the structure of each control lever 12 may be adapted for a particular slot. Thus, reference to FIG. 2 indicates that the first control lever 12 has an upper portion 27 displaced substantially further from the vertical axis of valve stem 14 than the second control lever 12'. Nevertheless, the unitary construction of the control lever is retained in both configurations. It is through the use of the spherical bearing means 19 allowing rotative and translative motion therethrough which permits such a structure.

Other modifications apparent to those skilled in the art are envisioned within the purview of this specification which should be considered as limited only by the appended claims.

The embodiment of the invention in which our exclusive property or privilege is claimed are defined as follows:

1. A control lever assembly for effecting linear translation of an actuator of a machine comprising:
   a control lever having one end adapted for pivoted connection to said actuator;
   a first bracket plate adapted for fixture to said machine;
   bearing means fixed in said first bracket for mounting said control lever and allowing rotation and translation of said control lever relative said bracket; and
   second bracket means fixed to, and extending generally at right angles to said first bracket plate, said second bracket means for limiting said rotative motion of said control lever to rotation about an axis generally lying in the plane of the first bracket and at right angles to the linear motion of said actuator.

2. The control lever assembly of claim 1 further comprising a slotted cover plate means removably fixed to the second bracket means and distal of the first bracket plate for limiting the rotation of the control lever to a predetermined angle whereby said actuator is linearly translatable a predetermined amount with said control lever affixed thereto.

3. The control lever assembly as set forth in claim 2 further comprising pliable means between the second bracket means and the cover plate means for dampening vibratory motion in the control lever.

4. The control lever assembly of claim 3 wherein the control lever is generally L-shaped.

5. The control lever assembly of claim 4 wherein the one end of the control lever adapted for connection to the actuator is bifurcated and further wherein each branch of the bifurcation defines a bore, said bores substantially in alignment.

6. The control lever assembly of claim 5 further comprising pin means removably positionable in the bores defined in the branched ends of the bifurcated control lever for the pivotal connection of said control lever to the actuator.

7. The control lever assembly of claim 1 wherein the bearing means comprises a spherical bearing assembly including an outer race fixed to the first bracket means and an inner race; said control lever slidably disposed through said inner race, said inner race permitting limited three axis rotation of said control lever relative the first bracket means.

8. The control lever assembly of claim 7 further comprising a slotted cover plate means removably fixed to the second bracket means and distal of the first bracket plate for limiting the rotation of the control lever to a predetermined angle whereby said actuator is linearly translatable a predetermined amount with said control lever affixed thereto.

9. The control lever assembly as set forth in claim 8 further comprising pliable means between the second bracket means and the cover plate means for dampening vibratory motion in the control lever.

* * * * *